No. 673,433. Patented May 7, 1901.
S. V. HANLEY.
VEHICLE WASHER.
(Application filed June 13, 1900.)
(No Model.) 2 Sheets—Sheet 2.
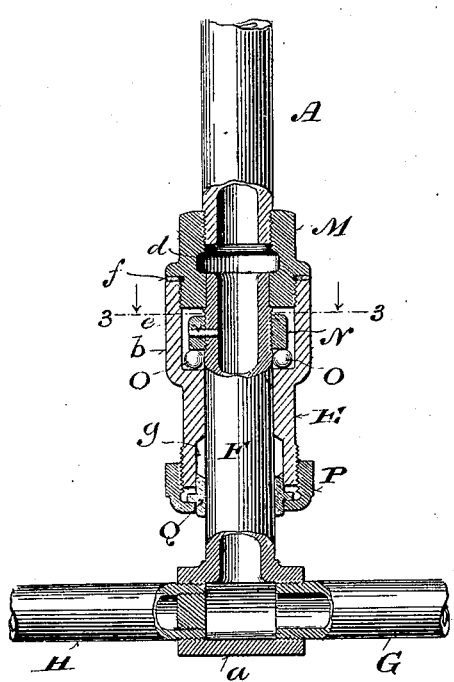
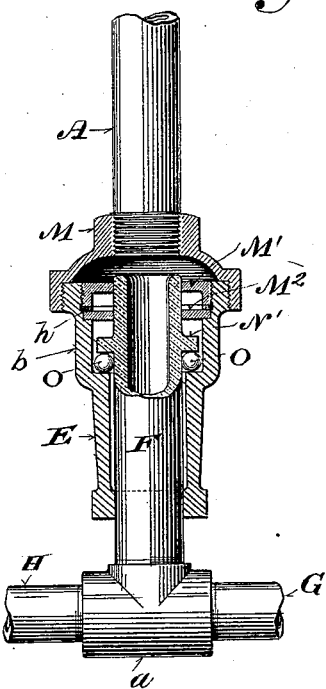
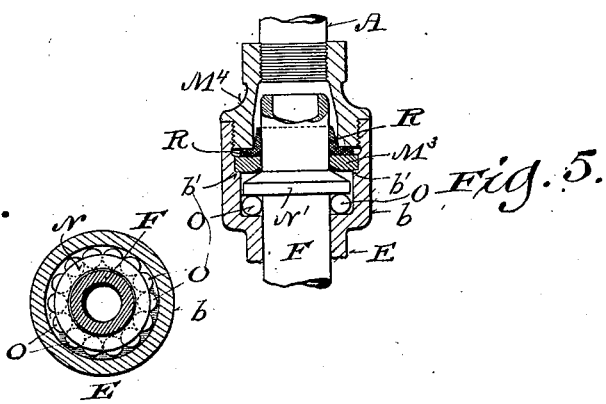
Witnesses:
Geo. W. Young
H. E. Burke
Inventor:
Skerritt V. Hanley
By Livingston A. Thompson
Attorneys

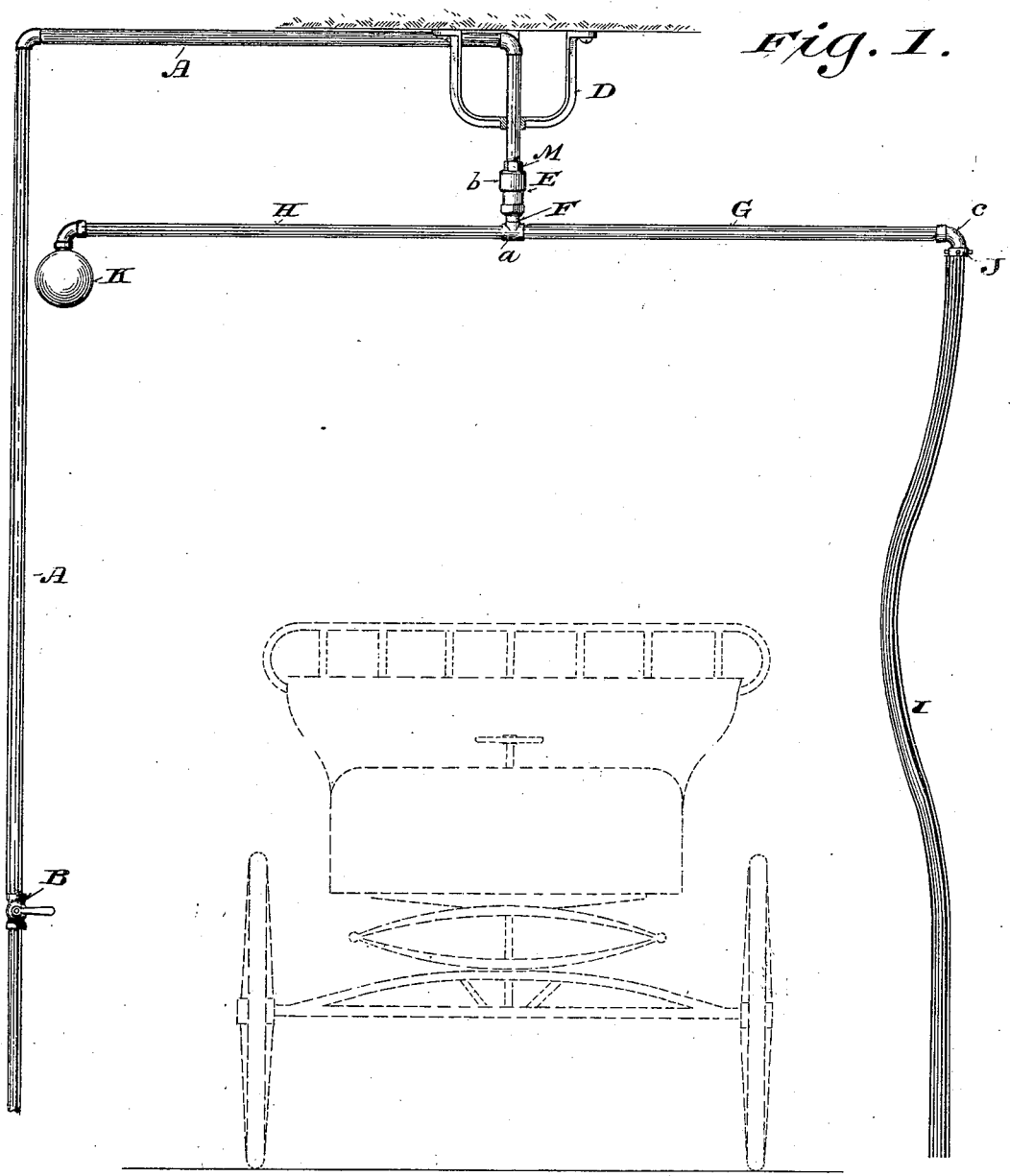

UNITED STATES PATENT OFFICE.

SKERRITT V. HANLEY, OF MILWAUKEE, WISCONSIN.

VEHICLE-WASHER.

SPECIFICATION forming part of Letters Patent No. 673,433, dated May 7, 1901.

Application filed June 13, 1900. Serial No. 20,135. (No model.)

*To all whom it may concern:*

Be it known that I, SKERRITT V. HANLEY, a citizen of the United States, and a resident of Milwaukee, in the county of Milwaukee and State of Wisconsin, have invented certain new and useful Improvements in Vehicle-Washers; and I do hereby declare that the following is a full, clear, and exact description thereof.

My invention has for its object to provide a vehicle-washer to be suspended from the ceiling of barns, &c., and is attached to a water-supply pipe, the essential feature being a swivel water-tight joint, a branch pipe projecting therefrom in either direction, to one side of which is attached a hose, the other side forming a counterbalance for the same; and it consists in certain peculiarities of construction and combination of parts, to be hereinafter fully set forth and subsequently claimed.

In the drawings, Figure 1 illustrates a general elevation of my device, showing the portion of a vehicle in dotted lines. Fig. 2 is an enlarged longitudinal section of one form of my swivel-joint. Fig. 3 is a cross-section of the same on line 3 3 of Fig. 2. Fig. 4 illustrates a longitudinal section of a modified form of the swivel-joint, and Fig. 5 illustrates a sectional view of still another form of swivel-joint.

Referring by letters to the drawings, A is the water-supply pipe, provided with a cock B, said pipe being attached to the side wall of the building and thence across the ceiling to any desired point, where it is turned down and terminates a short distance therefrom and is braced by a suitable spider or bracket D.

A swivel-joint E is screwed or otherwise secured to the end of the supply-pipe, below the bracket D, (the detailed construction of which will be fully set forth hereinafter.) The depending swiveled connection-pipe F of said joint terminates in a screw-threaded T $a$, and projecting therefrom are branch pipes G and H, respectively, the pipe G being the feed-pipe for a hose I and has at its end a downwardly-turned elbow $c$, upon which is fitted the hose-coupling J, while the branch H is a "blind pipe," or closed at its junction with the T, and also has a downwardly-turned elbow upon its outer end, which terminates into a counterbalance-weight K. This weight is such that it balances the hose and contents nicely (it being varied according to the length of the hose) and is an important feature of my invention, as without it the side thrust upon the swivel-joint would soon wear the same and cause it to leak. This thrust otherwise would be considerable, as in practice it is desirable to have the branch pipe G of considerable length in order that the operator may be able to move it around the vehicle (which is placed under the swivel-joint) and have the hose free of the said vehicle at all times, so that it may revolve around the same, it being controlled by one hand, thereby giving the operator freedom to use the other for cleaning, &c.

The construction of swivel-joint illustrated in Figs. 1, 2, and 3 of the drawings is as follows: The body or shell E is formed at the top into a cup $b$, which is internally screw-threaded to receive a cap M, that has a central opening $d$, the upper part of which is screw-threaded to receive the end of the supply-pipe A, and the bottom is turned smooth to receive the mouth of the swivel connection-pipe F, the latter being slightly reduced or turned at this point to make a water-tight joint, but free to revolve therein. The connection-pipe F is screw-threaded below this joint to receive a collar N, which when adjusted to the desired point is prevented from working loose by a pin $e$, that passes through it and the swivel-pipe F, and interposed between said collar and the bottom of the cup portion of the shell E are a series of balls O, of sufficient diameter to fit loosely between the inner wall of the cup $b$ and the outer wall of the swivel connection-pipe. By the construction above described a ball-chamber is formed which is water-tight, it being desirable that no moisture should get into the chamber to cause rust, which would in time prevent easy movement of the swivel-pipe F. A brass washer $f$, as shown, may be interposed between the cap M and the edge of the cup $b$, the corrosion of which serves to prevent the aforesaid members from working loose.

The body or shell E of the swivel-joint is reduced below the cup portion $b$ and has a smooth bore in which the swivel-pipe F turns and is screw-threaded externally at its lower end to receive a cap P and also cut away internally to form an annular groove g, into which a gland Q fits and is held by the cap P, the whole forming a stuffing-head for the swivel-pipe and preventing any leak at this end of the joint should moisture get into the ball-chamber.

By the peculiar construction of the swivel-joint above described it will be readily understood that the swivel-pipe F throughout its length has three bearing-points—top, bottom, and intermediate—making the joint firm and guarding against any liability for the same to become loose by continuous usage, and being perfectly balanced by reason of the weight, &c., there will be no side thrust, and the weight of the whole device coming upon the balls in a vertical direction causes the same to be perfectly free to revolve with the least movement of the hose by the operator.

The modified joint illustrated in Fig. 4 of the drawings has all the essential elements of the form above described, but cheaper in construction, for the reason that in this case I dispense with the stuffing-head at the bottom of the joint, making simply a ground joint where the swivel-pipe has its bearing, the upper end of which has an additional bearing in a disk $M^2$, that is held in place by the cap $M'$, which is threaded to match an internal thread on the cup b, and interposed between said cup and disk is a washer h, the cap M in this case being screwed upon the outside of the cup portion of the shell E, and a flange $N'$ is turned upon the swivel-pipe in place of the collar N shown in my preferred construction.

The form of swivel-joint illustrated in Fig. 5 of the drawings shows a hot packing R above the ball-chamber, and a disk $M^3$, which rests upon a shoulder $b'$ of the cup b and forms a loose bearing for the swivel-pipe and also serves as a seat for the hot packing, which is held down and compressed against the swivel-pipe by the cap $M^4$, the whole construction forming a packing-head above the ball-chamber.

I have not shown the lower joint of the swivel-pipe in Fig. 5, but either the stuffing-head or ground joint illustrated in the preceding figures may be used, it being essential that the swivel-pipe has a tight bearing below the ball-chamber as well as above.

Having thus described my invention, what I claim as new, and desire to secure by Letters Patent, is—

1. In a vehicle-washer a water-supply pipe, a cap connected to the end of said pipe, a shell attached to cap having a reduced portion below its junction therewith forming a ball-chamber, a swivel-pipe fitted in said shell having a collar fast thereto and revoluble in the chamber, a series of balls interposed between said collar and bottom of the chamber, and a water-tight joint between the mouth of the swivel-pipe and shell, whereby all moisture is excluded from the ball-chamber, a feed-pipe connected to the swivel-pipe at a right angle thereto, and below the shell, a hose-coupling at the outer end thereof, a blind pipe projecting from the swivel-pipe on a line with the feed-pipe and in opposite direction therefrom, and a counterbalance-weight connected to the end of the blind pipe, substantially as set forth.

2. In a vehicle-washer a water-supply pipe, a shell attached to the end of said pipe, a swivel-pipe fitted in said shell having longitudinal water-tight bearings at the top and bottom thereof, a chamber in the shell, a collar fast to swivel-pipe, and revoluble in said chamber and a series of balls interposed between the collar and the bottom of said chamber, a feed-pipe projecting from the swivel-pipe below the shell and terminating in a hose connection at the outer end and a blind pipe projecting from the swivel-pipe in the opposite direction from the feed-pipe substantially as set forth.

In testimony that I claim the foregoing I have hereunto set my hand, at Milwaukee, in the county of Milwaukee and State of Wisconsin, in the presence of two witnesses.

S. V. HANLEY.

Witnesses:
GEO. W. YOUNG,
L. A. THOMPSON.